Dec. 6, 1955   C. L. BARKER   2,725,896
VALVES
Filed July 10, 1952   2 Sheets-Sheet 2
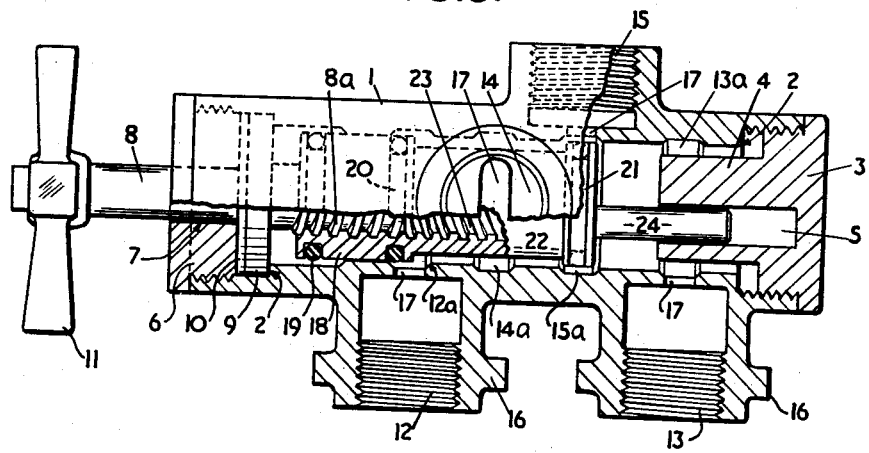
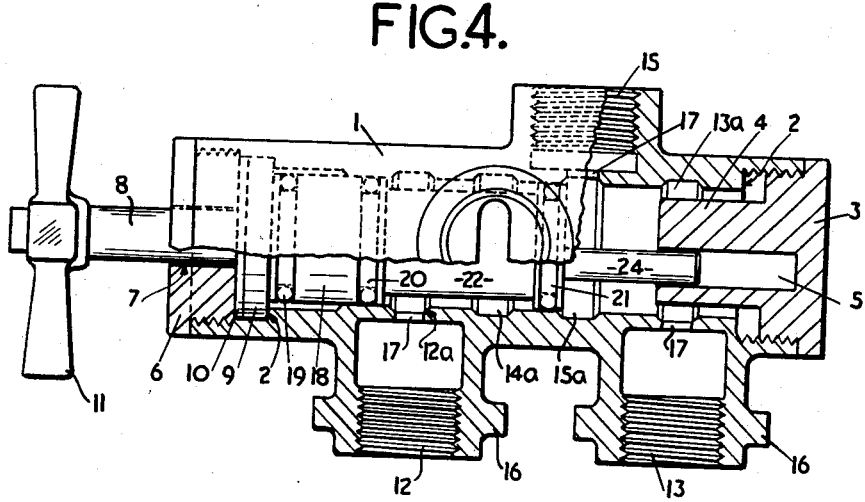

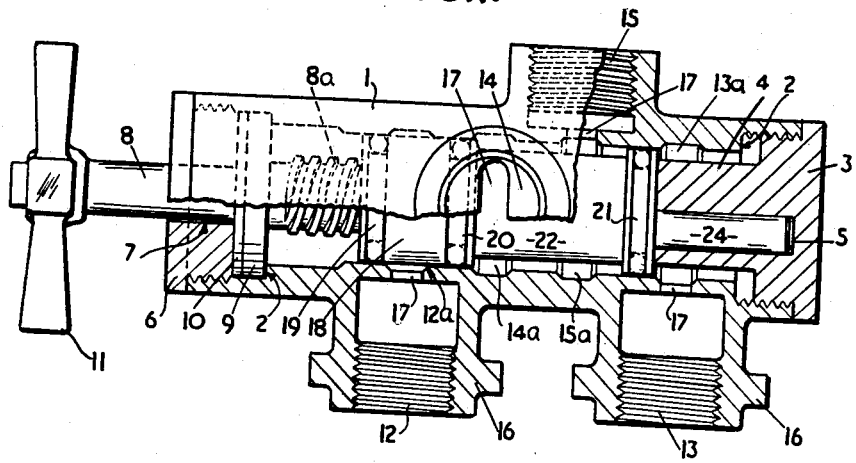
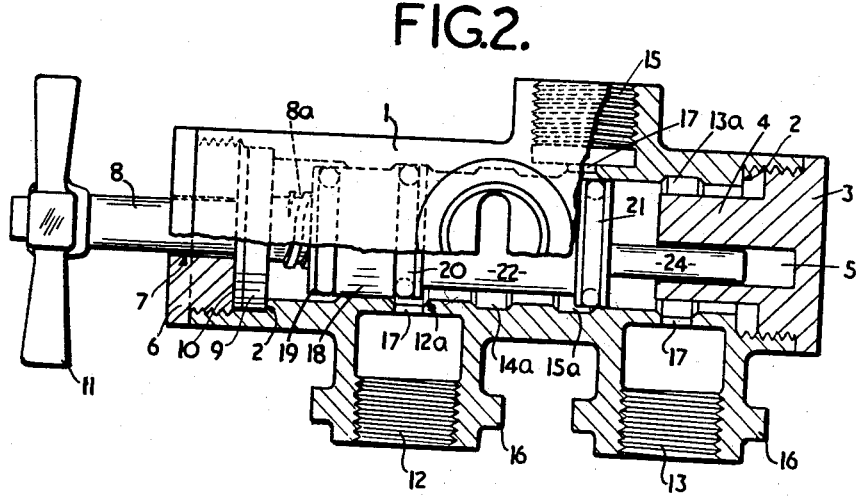

United States Patent Office 2,725,896
Patented Dec. 6, 1955

2,725,896
VALVES

Clifford Lewis Barker, Cheltenham, England, assignor to Walker Crosweller & Company Limited, Cheltenham, England Application July 10, 1952, Serial No. 298,018
Claims priority, application Great Britain July 12, 1951

3 Claims. (Cl. 137—625.42)

This invention has reference to valves for controlling the flow of fluids, and is particularly concerned with valves for controlling the flow of fluid under pressure to a measuring and/or recording instrument.

The principal object of the present invention is to provide a new or improved valve which prevents a sudden and rapid flow of fluid through the valve so that when the latter is connected to the interior of an instrument, the possibility of the mechanism within the instrument being damaged or strained, and of the setting of the said mechanism being disturbed as a consequence of internal surges or sudden changes in pressure, is minimised.

Another object of the invention is to provide a valve for controlling the flow of fluid from different sources and at different pressures, to different destinations. For example, the valve is adapted to control the flow of fluid from opposite sides of an orifice plate or equivalent restriction in a fluid supply pipe, to different zones within the interior of an instrument for measuring and/or recording the pressure differential on opposite sides of the said restriction.

A further object of the invention is to enable a valve, when a fluid supply pipe is connected therethrough to a flow measuring and/or recording instrument of the liquid-sealed bell type, to minimise the possibility of the sealing liquid within the instrument being spilled from its reservoir or container by sudden changes or surges of pressure.

Yet another object of the invention is to enable a valve, when being utilised for the above mentioned purposes, to control effectively the flow of fluid to an instrument even when the fluid is under considerable pressure.

Still another object of the invention is to provide a fluid flow control valve which is of a compact and simple design, is economical to manufacture and has a long useful life.

The above and other objects of the invention will be more apparent upon reading the following description in conjunction with the accompanying drawings which show a fluid flow control valve constructed in accordance with a preferred embodiment of the present invention; however, it is to be understood that the invention is not restricted to the specific embodiment described and shown as this may be varied without departing from the spirit and scope of the said invention.

In the said drawings:

Figure 1 is an elevation, partly in section, of a fluid flow control valve, the valve being shown in its closed position, that is, in the position for terminating the flow of fluid.

Figures 2 and 3 are part sectional elevations similar to Figure 1, but showing the valve in two different intermediate and partially open positions, and Figure 4 is a part sectional elevation, again similar to Figure 1, but showing the valve in its fully open position for connecting each of two fluid inlets to a corresponding one of two fluid outlets.

The valve shown in the drawings is particularly suitable for controlling the flow of fluid from opposite sides of an orifice plate in a pipe to the interior of a fluid flow measuring and/or recording instrument of the liquid-sealed bell type. The valve body consists of an open-ended cylinder 1; each end of the cylinder is formed with an internal shoulder 2 and is tapped outwardly of the said shoulder. One body end is closed by a threaded plug 3 which is provided, on its internal surface, with a co-axial boss 4 extending into the interior of the body beyond the corresponding shoulder 2.

A blind hole 5, of D-shape or other non-circular cross section, extends from the innermost end of the boss, but terminates short of the outer end of the plug 3. Conveniently, the said blind hole may be formed by machining a blind circular bore in the boss and securing a D-section insert, of the same length as the bore, within the latter. The other end of the body 1 is closed by a screw-threaded plug 6 having an axial passage 7 therethrough, the said plug terminating short of the corresponding body shoulder 2. A spindle 8 extends through the passage 7 and is formed, inwardly of the plug 6, with a peripheral flange or shoulder 9 which seats against the corresponding body shoulder 2; a washer 10 is disposed between the flange 9 and the inner end of the plug 6 and a handle 11 is secured to the outer end of the spindle 8, the arrangement being such that the spindle, flange and handle assembly may be rotated relatively to the body and plug but is prevented from axial movement relatively to the said body and plug. The spindle projects beyond the flange 9 inwardly of the body, the said projection 8ª being formed with a coarse or quick-pitch screw thread.

Intermediate its closed ends, the body is formed with four radial tapped sockets, 12, 13, 14 and 15, which are spaced apart lengthwise of the body, by predetermined distances. Each socket is adapted to receive a separate pipe, which is screwed thereinto, so that, for example, the valve may be connected, on the one hand, to the interior of a fluid supply line on the opposite sides of an orifice plate in the said line, and, on the other hand, to different internal zones of a measuring and/or recording instrument. In such circumstances, the inlet sockets 12 and 13 are connected to pipes leading from the supply line and the outlet sockets 14 and 15 are connected to pipes leading to the instruments. Each of the inlet sockets is formed with a flange 16 whereby the valve is adapted to be mounted upon a panel or some other support, such as the casing of the instrument.

The interior of each socket communicates with the interior of the body 1 through a slot 17 the longer centre line of which is disposed in a circumference of the said body. The several slots open to the interior of the body through the floors of circumferential grooves 12ª, 13ª, 14ª and 15ª respectively, formed around the internal periphery of the body bore and the slots 17 of the outlets 14, 15, are located in between the slots of the inlets 12, 13. The boss 4 is of such length that its inner end projects beyond the peripheral groove 13ª.

A piston 18 is slidably accommodated within the body bore, the length of the piston being less than the distance between the spindle flange 9 and the inner end of the boss 4; the piston is, therefore, capable of being reciprocated from one extreme position (shown in Figure 1) wherein it abuts the boss, to an opposite extreme position (shown in Figure 4) wherein it abuts the spindle flange and overlaps the peripheral groove 12ª and the slot 17 in the latter. The piston is formed with three peripheral grooves in which synthetic rubber or equivalent deformable rings 19, 20 and 21 are inserted, the said rings conveniently being of circular cross-section and being of external dimensions such that when inserted within the body bore, they are compressed and distorted; consequently, the rings effectively prevent leakage of fluid between the piston and internal surface of the body except when in register with any one of the grooves 12a, 13a, 14a or 15a.

Between the rings 20 and 21, the piston is formed with a neck or reduced diameter portion 22, the length of which slightly exceeds the distance between the adjacent edges of the body grooves 12a and 15a (see Figure 2).

The piston end adjacent the spindle flange 9 is formed with a blind tapped bore 23 (see Figure 3), the pitch of the tapping being equal to that of the thread on the spindle extension 8a so that the latter may be screwed into the said bore. The piston end adjacent the plug 3 is provided with a projection 24 which is of a cross section corresponding to that of the blind hole 5 in the said plug; the said projection engages the said hole, thereby preventing rotation of the piston within the body without interference with piston reciprocation; also the projection is of a length greater than the maximum stroke made by the piston when travelling from one extreme position to the other so that the projection does not become disengaged from the blind hole at any time during the operation of the valve. Since the spindle 8 and its extension 8a are free to rotate but are held against endwise movement within the body, whereas the piston is free to reciprocate but is held against rotation within the body, rotation of the spindle by manual operation of the handle 11, causes endwise displacement of the piston.

When the piston is in the extreme position (shown in Figure 1) wherein it abuts the boss 4, the valve is closed because the sealing ring 21 is disposed between the grooves 13a and 15a so that fluid supplied to the valve through the inlet socket 13 cannot flow beyond the said ring; similarly, the sealing ring 20 is disposed between the grooves 12a and 14a and, therefore, fluid supplied to the valve through the other inlet socket 12 cannot flow beyond the said ring 20. Furthermore, the third sealing ring 19 which is always disposed between the groove 12a and the spindle flange 9, is under compression and, therefore, prevents access of fluid to the said flange so that the fluid is unable to seep or leak past the flange and through the spindle passage 7. The incorporation of this third ring in the valve consequently obviates the necessity of providing a gland and stuffing box in the said passage; otherwise, the said ring 19 serves no useful purpose.

Upon rotation of the spindle in the direction which moves the piston endwise within the body 1 away from the boss 4, the sealing ring 20 (see Figure 2) registers with the groove 12a before the ring 21 registers with the groove 15a. Therefore, whilst the latter ring still prevents flow of fluid through the inlet socket 13, fluid is free to flow through the inlet socket 12, around the piston neck 22 and through both outlet sockets 14, 15, to the interior of the instrument.

When the inlet sockets are supplied with fluid at different pressures, preferably the socket 12 is supplied with the fluid at the lower pressure; also, since the fluid is able to flow to the outlets 14, 15, only through the restricted clearance between the piston and the edge of the groove 12a which is overlapped by the neck 22, the fluid is able to flow to the instrument at a limited rate so that the build up of pressure within the instrument is gradual and is equal in both the zones to which the said outlets are connected. Therefore, the instrument mechanism is not subjected to a sudden pressure surge so that the said mechanism is unlikely to be damaged or strained, the adjustment of the said mechanism is unlikely to be disturbed, and the sealing liquid is unlikely to be spilled from its reservoir or container.

Continued rotation of the spindle in the same direction brings the sealing ring 21 into register with the groove 15a (see Figure 3) so that fluid supplied to both inlets 12, 13, is able to flow to the instrument through both outlets 14, 15, thereby effecting an additional and equal increase in pressure in both zones of the instrument.

By continuing the rotation of the spindle, the ring 20 is first taken clear of and beyond the groove 12a, thereby enabling the said ring to prevent access of fluid to the spindle flange and spindle passage 7; then the sealing ring 21 is taken clear of and beyond the groove 15a, thereby enabling the said ring to isolate the inlet socket 12 from the outlet socket 15 and the inlet socket 13 from the outlet socket 14. As a consequence, the lower pressure fluid supplied to the socket 12 is able to be discharged from the valve only through the socket 14 and the higher pressure fluid supplied to the socket 13 is discharged only through the socket 15; there is, therefore, a drop in pressure in the instrument zone to which the socket 14 is connected, the said drop being equal to the pressure difference between the two fluids.

Finally, as the ring 21 passes clear of the groove 15a, the piston is taken into abutment with the spindle flange (see Figure 4) thereby locating the piston at its opposite extreme position and placing the valve in its fully open position.

It will be seen from the drawings that prior to the registration of the ring 20 with the groove 12a, the ring 19 enters an enlarged diameter portion 24 of the piston bore. Hence, when the valve is in its fully open position, an annular space exists around the piston end which is in abutment with the flange, in which space any fluid which may possibly seep past the piston towards the flange during the short time between the entry of the ring 19 into the bore portion 24 and the travel of the ring 20 beyond the groove 12a accumulates.

Rotation of the spindle in the reverse direction returns the piston to its initial position to close the valve and cut off communication between the inlets and the interior of the instrument so that, in the event any part of the mechanism should need adjustment, repair or replacement, this may be effected without having to disconnect any of the pipes from the sockets 12, 13, 14 and 15, or to dismantle the valve or any part thereof.

Although in the specific embodiment of the invention described above, reference has been made to the use of the valve for controlling the flow of fluid at different pressures to a measuring and/or recording instrument, it is to be understood that the valve may be utilised for other similar purposes. Also, whilst the piston displacement is effected by a threaded spindle engaging a tapped blind bore in the piston, it is to be understood the piston displacement may be effected, for example, by a simple push and pull mechanism or merely by arranging for another extension from the piston to project through the plug passage 7 and by providing a knob on the outer end of the said projection. Again, the sealing ring 19 may be so located on the piston that it does not enter the enlarged bore portion 24 until the ring 20 has moved beyond the groove 12a during the movement of the piston away from the boss 4. In fact, any valve construction as defined in the following claims is to be regarded as falling within the scope of the invention.

What I claim is:

1. A valve for controlling the flow of fluid, comprising a bored body having two fluid inlets and two fluid outlets, each inlet and outlet opening to a corresponding annular groove in the wall of the body bore, the said inlets and outlets being spaced apart axially of the bore and the two outlets being formed between the two inlets, a piston slidably accommodated within the bore, two sealing rings disposed around and movable with the said piston, and mechanism for positively displacing the piston axially of the bore from one extreme position, successively through two intermediate positions, to an opposite extreme position, the said rings being spaced apart axially of the piston by a distance such that, in the said one extreme position the rings are disposed between said inlet grooves but on opposite sides of said outlet grooves, in the first of the said intermediate positions one ring is in register with one inlet groove and the other ring remains between the other inlet groove and the adjacent outlet groove, in the second of the said intermediate positions the said other ring is in register with the said adjacent outlet groove and the said one ring remains at least in partial register with the said one inlet groove, whereas, in the said other extreme position the said other ring is disposed between the outlet grooves and the said one ring is disposed on the side of the said one inlet groove opposite to the outlet grooves.

2. A valve for controlling the flow of fluid, comprising a bored body having two fluid inlets and two fluid outlets each of said inlets and outlets opening into a corresponding annular groove in the wall of the bore, each groove being of a dimension axially of the bore greater than the corresponding dimension of the inlet or outlet opening thereto, the said inlets and outlets being spaced apart axially of the bore and the two outlets being located between the two inlets, a piston slidably accommodated within the bore and having a portion of reduced cross-section, the axial dimension of said piston portion being greater than the distance between the said outlet grooves but less than the distance between the said inlet grooves, the said piston also having, adjacent each end of said reduced portion, an annular groove, a sealing ring located within each of said piston grooves, and mechanism for positively displacing the piston axially of the bore from one extreme position, through two intermediate positions in succession, to an opposite extreme position, the said rings being so spaced apart that when the piston is in the said one extreme position the rings are disposed between said inlet grooves but on opposite sides of said outlet grooves, in the first of the said intermediate positions one ring is in register with one inlet groove and the other ring remains between the other inlet groove and the adjacent outlet groove, in the second of the said intermediate positions the said other ring is in register with the said adjacent outlet groove and the said one ring remains at least in partial register with the said one inlet groove, whereas, in the said other extreme position the said other ring is disposed between the outlet grooves and the said one ring is disposed on the side of the said one inlet groove opposite to the outlet grooves.

3. A valve for controlling the flow of fluid, comprising a bored body having two fluid inlets and two fluid outlets opening to the body bore, the said inlets and outlets being spaced apart axially of the bore, the outlets being formed between the inlets, and the bore having an end portion of enlarged diameter which end portion is formed wholly to one side of the said inlets and outlets, a piston slidably accommodated within the said bore, mechanism for positively displacing the said piston endwise of the bore from one extreme position wherein it is located wholly to one side of said enlarged bore portion, through two successive intermediate positions, to an opposite extreme position, the three sealing rings disposed around and movable with the said piston, the said rings being so spaced apart that when the piston is in the one extreme position one end ring is disposed between one inlet and its adjacent outlet, the intermediate ring is disposed between the other inlet and its adjacent outlet and the other end ring is disposed between the said other inlet and the said enlarged bore portion, when the piston is in the first of said intermediate positions, the said one end ring is still disposed between the said one inlet and its adjacent outlet, the said intermediate ring is in register with said other inlet and the said other end ring is disposed within the said enlarged bore portion, when the piston is in the second of said intermediate positions, the said one end ring is at least in partial register with the outlet adjacent the said one inlet, the said intermediate ring is at least in partial register with the said other inlet and the said other end ring is again disposed in the said enlarged bore portion, whereas, when the piston is in the said other extreme position the said one end ring is disposed between the two inlets, the said intermediate ring is disposed between the said other inlet and the said enlarged bore portion, and the said other end ring is again disposed with the said enlarged bore portion.

References Cited in the file of this patent

UNITED STATES PATENTS

| | | |
|---|---|---|
| 611,064 | De Marest | Sept. 20, 1898 |
| 2,485,504 | Morgan | Oct. 18, 1949 |
| 2,542,391 | Brown | Feb. 20, 1951 |